Sept. 9, 1958  J. F. RUSHING  2,850,785
METHOD AND MEANS FOR RELEASING MOLDING
FORMS FROM A MOLDED PRODUCT
Filed Jan. 4, 1957

Inventor:
James F. Rushing
By Wilson & Geppert
Attorneys

United States Patent Office 2,850,785
Patented Sept. 9, 1958

2,850,785

METHOD AND MEANS FOR RELEASING MOLDING FORMS FROM A MOLDED PRODUCT

James F. Rushing, La Grange Highlands, Ill., assignor to Ceco Steel Products Corporation, Chicago, Ill., a corporation of Delaware Application January 4, 1957, Serial No. 632,530

5 Claims. (Cl. 25—120)

This invention is concerned with the molding art and is especially valuable in connection with the production of poured concrete walls or floors of the waffle type in the production of which dome-shaped molding forms are employed.

The removal of these forms from the concrete structure in the conventional manner has heretofore been a laborious job involving the utilization of a pinch bar and similar tools for prying the molds out of the set concrete. Such procedure is also expensive not only by reason of time and labor involved, but also because of the resultant damage to the molds and particularly to the flanges thereof which are frequently damaged so as to render them unfit for subsequent use.

The primary purpose of my present invention is to provide a method and means whereby molding forms may be rapidly and economically released from the molded product and without distortion or damage of any character to the forms or to the product.

Another object is the provision of a method especially adapted to be used in connection with pressed steel molding forms which are rigid in structure and unless warped or distorted in being separated from the molded product are capable of repeated re-use.

My novel method of form separation or release, by the employment of fluid pressure applied progressively over the surface of the steel dome form, effects its separation from the molded product without damaging the form.

In accordance with my method the force of the fluid delivered to the plenum chamber produces a minute flexing of the mold enabling the fluid to progressively intrude between the mold and the product, causing the mold to separate from the product.

To facilitate an understanding of my invention, that specific method and means for releasing forms which at present seems preferable is disclosed on the accompanying drawing.

Referring to the drawing.

Figure 1:
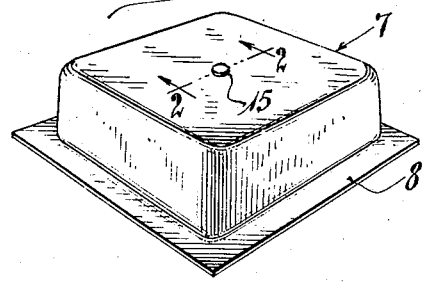
Figure 1 is a perspective view of a steel dome molding form to which my invention is particularly adapted.

Referring now to the drawings more in detail, reference character 7 indicates generally a mold adapted for use in the molding of concrete walls, floors and the like of the waffle type. While my invention is capable of use in connection with molds of various shapes and made of various materials, its use is especially advantageous with what are customarily termed steel dome forms which are made of drawn steel shaped to form a sloping dome surrounded at the open end by a marginal flange 8.

Figure 4:
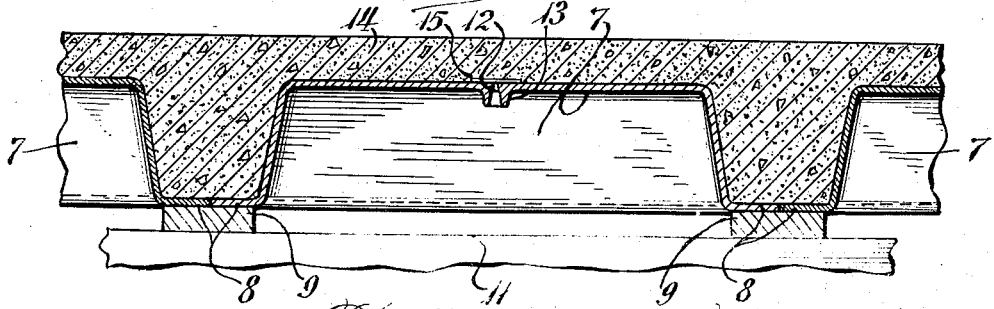
Fig. 4 is a view similar to Fig. 2 showing the relation of the molded product to the mold after being poured.
Figure 6:
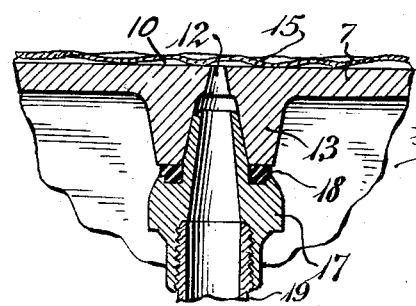
Fig. 6 is an enlarged fragmentary sectional view on the line 6—6 of Fig. 5.

Such forms, whether of the steel dome type or other construction, are customarily supported, each in contiguous relation to the next, upon a supporting frame consisting, in this instance, of soffit boards 9 carried upon suitable supporting members 11. The forms contemplated by my invention differ from standard forms customarily used in that the upper wall of the form is provided with an opening 12 surrounded by a depending nipple or protuberance 13, as best shown in Figs. 4 and 6. This opening is employed as an inlet opening for a supply of air under pressure which is forced between the mold and the molded product indicated by reference character 14. This product may be composed of any suitable material and in the particular embodiment of the invention disclosed consists of a poured concrete slurry which has assumed a set above and between the various forms, as is customary in concrete constructions of this general type.

Before the concrete is poured, the opening 12 is covered by a patch 15 of suitable sheet material, such as light fabric, paper, or other fibrous material crinkled or otherwise treated to provide a roughened surface which is opposed to the upper surface of the mold. The patch is considerably larger than the opening through the mold, as will be apparent from Figs. 2 and 4, and is provided on its lower surface with a light coating of adhesive, so that when the patch is laid upon and lightly pressed against the surface of the mold it will adhere thereto and remain in position so as to cover the opening and preclude access of concrete thereto when poured. The roughened surface of the patch opposed to the outer surface of the mold provides a series of multiple, random passages of small size leading from the center air opening to the perimeter of the patch. These passages in the aggregate form a plenum chamber 10 between the patch and mold into which air under pressure may be delivered through the opening in the form.

Figure 2:
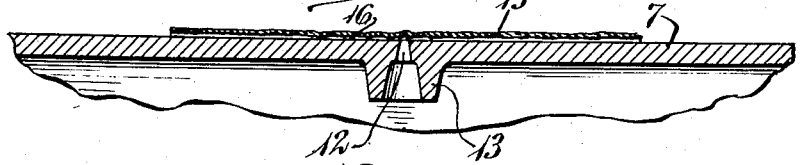
Fig. 2 is a fragmentary enlarged sectional view on the line 2—2 of Fig. 1.
Figure 3:
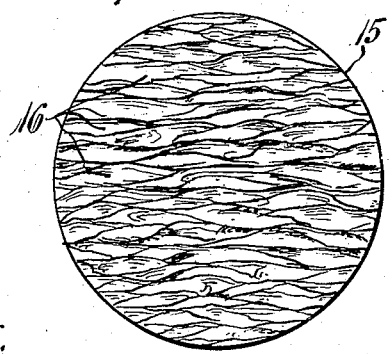
Fig. 3 is a face view of the patch or sheet shown in Fig. 2 as applied to the molding form.

The patch in exaggerated form is shown in Figs. 2 and 3. The roughened face illustrated in Fig. 3 serves to provide the aforementioned multiple passages indicated generally by 16 and shown also in Fig. 2. These passages forming the plenum chamber between the opposed walls of the patch and the mold are small and may be of any shape capable of conducting air or other fluid under pressure from the central air opening 12 in the form to the perimeter of the patch.

After the concrete has set upon the forms provided with air openings and plenum chambers above described and the supporting framework including the elements 9 and 11 have been removed, the release of the forms from the molded structure is effected in the following manner.

Figure 5:
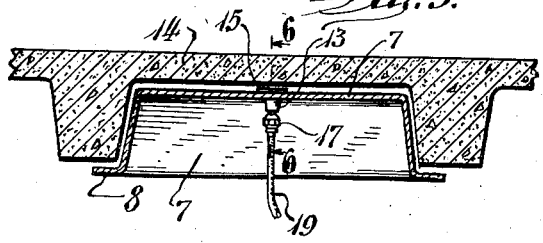
Fig. 5 is a view similar to Fig. 4 illustrating to an exaggerated degree the separation of the mold from the molded product.

A nozzle 17 approximating the shape illustrated in Fig. 6 and equipped with a sealing gasket of rubber or other suitable material is connected with the nipple 13 of the form by inserting the tip of the nozzle into the nipple and pressing upwardly on the nozzle to establish a tight connection between the nozzle and the nipple. The nozzle is mounted upon the end of a pipe 19 which is connected by a hose or suitable flexible conduit with a source of compressed air or other suitable fluid under pressure. This air or other fluid under substantial pressure is delivered through the opening 12 to the plenum chamber formed by the patch 15 and is forced to the perimeter of the patch where it intrudes between the surface of the form and the opposed molded concrete. The fluid emanates from the plenum chamber around the perimeter of the patch and continues through progressively enlarging substantially circular areas. In seeking its passage between the opposed surfaces of the form and the product, the fluid exerts a separating pressure upon these surfaces which releases the form from the molded product, as shown in exaggerated form in Fig. 5. While the releasing effect of the air or other fluid may not separate the form from the product to the extent illustrated before the fluid escapes around the form, the release will be sufficient to enable the form to be manually withdrawn from the product without the employment of tools or instruments by which the flanges of the form might be damaged.

While I have shown and described my invention in connection with the molding of concrete products, it should be apparent that it is applicable to the molding of various products and compositions with molds of various shapes and materials.

The details illustrated and described may also be obviously varied within considerable limits without departing from the essence of my invention as defined in the following claims.

I claim:

1. In combination, a molding form for use in the construction of concrete building structures, said form having an aperture and a nipple in one wall thereof to receive a nozzle for supplying air under pressure to said nipple and aperture, and a thin patch of crinkled fibrous material applied over the aperture to provide multiple outwardly opening passages between the undersurface of said patch and the adjacent surface of said form, whereby air under pressure supplied to said nipple is delivered through said nipple and aperture and dispersed outwardly through said passages and beyond the periphery of said patch to separate the form from the molded product.

2. In combination, a hollow molding form for use in the construction of poured concrete building structures, said form having an aperture through one of its walls and means for supplying a source of fluid under pressure to said aperture, and a thin patch of material disposed on the outer face of said form and over and around said aperture, said patch having multiple outwardly opening passages on its undersurface between it and the adjacent surface of the mold for delivering fluid under pressure from the aperture to the perimeter of the patch and directly outwardly therebeyond for separating the form from the molded product.

3. In combination, a molding form for use in the construction of concrete building structures, said form having an aperture through one wall thereof and a connection to said aperture for a source of air under pressure, and a patch of thin crinkled material affixed to the outer face of said wall to cover and surround said aperture, said patch provided on its undersurface with multiple outwardly opening passages communicating with said aperture and opening outwardly at the periphery of said patch, whereby air under pressure supplied to said connection and aperture is dispersed outwardly through said passages and beyond the periphery of said patch to separate the form from the molded product.

4. The method of separating a molding form from a molded product, which comprises providing an air opening through a wall of a molding form and a connection for supplying air under pressure to said opening, applying a patch of crinkled material to the outer face of said form over and around said opening to prevent access of the molding material to said opening and to provide plural passages forming a plenum chamber communicating with said opening, applying said molding material to said form so as to cover said patch and delivering air under pressure through said connection and opening into said plenum chamber and outwardly through said passages and directly into the space between said form and the molded product after said product has become set, whereby said form is released from said product.

5. The method of releasing a molding form from a molded concrete product, which consists in providing a wall of a molding form with a centrally disposed aperture and a connection for a source of gaseous fluid under pressure, securing to the outer face of said wall over and around said aperture a relatively small patch of thin crinkled fibrous material providing a shallow peripherally open chamber between said patch and said wall, covering said patch and the surrounding area of said wall with concrete slurry, causing said slurry to set, and delivering a gaseous fluid through said connection and aperture into said chamber under sufficient pressure to cause said fluid to pass through said chamber and intrude between the molded concrete product and the opposed form surface, whereby said form is separated from said concrete product.

References Cited in the file of this patent

UNITED STATES PATENTS

| | | |
|---|---|---|
| 1,434,242 | Allbright | Oct. 31, 1922 |
| 2,148,084 | Nock | Feb. 21, 1939 |
| 2,396,406 | Anderson | Mar. 12, 1946 |
| 2,480,477 | Jones | Aug. 30, 1949 |
| 2,628,402 | Billner | Feb. 17, 1953 |

FOREIGN PATENTS

| | | |
|---|---|---|
| 473,458 | Italy | July 30, 1952 |